(12) United States Patent
Dexter et al.

(10) Patent No.: US 10,010,982 B2
(45) Date of Patent: Jul. 3, 2018

(54) OPEN CONTAINMENT FRAME FOR TARGETED COMPRESSION TREATMENT OF ROTATING SHAFT PRODUCTS

(71) Applicant: Ellwood National Investment Corp., Wilmington, DE (US)

(72) Inventors: Ronald F. Dexter, Sharon, PA (US); Judith A. Shafer, Neshannock, PA (US); Roger L. Garrett, New Wilmington, PA (US)

(73) Assignee: ELLWOOD NATIONAL INVESTMENT CORP., Wilmington, DE (US)

( * ) Notice: Subject to any disclaimer, the term of this patent is extended or adjusted under 35 U.S.C. 154(b) by 0 days.

(21) Appl. No.: 15/507,104

(22) PCT Filed: Jul. 29, 2015

(86) PCT No.: PCT/US2015/042697
§ 371 (c)(1),
(2) Date: Feb. 27, 2017

(87) PCT Pub. No.: WO2016/032673
PCT Pub. Date: Mar. 3, 2016

(65) Prior Publication Data
US 2017/0266768 A1 Sep. 21, 2017

Related U.S. Application Data

(60) Provisional application No. 62/043,230, filed on Aug. 28, 2014.

(51) Int. Cl.
*B21D 3/16* (2006.01)
*B23P 9/02* (2006.01)
(Continued)

(52) U.S. Cl.
CPC .............. *B23P 9/02* (2013.01); *B21D 3/16* (2013.01); *B24B 39/045* (2013.01); *B21D 3/10* (2013.01); *B23P 2700/07* (2013.01)

(58) Field of Classification Search
CPC ... B21D 3/00; B21D 3/02; B21D 3/10; B21D 3/14; B21D 3/16; B23P 9/02; B23P 2700/07; B24B 39/045
See application file for complete search history.

(56) References Cited

U.S. PATENT DOCUMENTS 1,442,102 A * 1/1923 Spangenberger ........ B21D 3/16
33/603
3,060,993 A * 10/1962 Delf ........................ B21D 3/16
72/293

(Continued)

FOREIGN PATENT DOCUMENTS

CN 202317583 U 7/2012
CN 202607181 U 12/2012
(Continued)

OTHER PUBLICATIONS

Translation, FR 1482191A, May 1967.*
(Continued)

*Primary Examiner* — Edward Tolan
(74) *Attorney, Agent, or Firm* — Ference & Associates LLC

(57) ABSTRACT

An embodiment includes a suspended supporting device for targeted compression treatment of rotating shaft products, including: a containment frame including: a main portion; and an articulating arm including an attachment for at least one targeted compression cartridge, the at least one targeted compression cartridge including at least one angled compression element; a support element attached to the main portion and providing internal stabilization to the supporting device; a mechanism providing motion to the articulating (Continued)

arm with respect to the main portion; and an attachment mechanism for suspending the supporting device via attachment to an external element. Other aspects are described and claimed.

10 Claims, 9 Drawing Sheets

(51) Int. Cl.
*B24B 39/04* (2006.01)
*B21D 3/10* (2006.01)

(56) References Cited

U.S. PATENT DOCUMENTS

| | | | | |
|---|---|---|---|---|
| 3,074,463 A | * | 1/1963 | Leighter | B21D 3/16 72/31.03 |
| 3,501,941 A | * | 3/1970 | Long | B21D 3/00 72/411 |
| 3,688,539 A | * | 9/1972 | Hogarth | B21D 3/16 72/109 |
| 2003/0188565 A1 | * | 10/2003 | Andras | B21D 3/16 72/447 |
| 2007/0169532 A1 | | 7/2007 | Reeb et al. | |

FOREIGN PATENT DOCUMENTS

| | | | |
|---|---|---|---|
| DE | 102006058710 A1 | 6/2008 | |
| FR | 1482191 A * | 5/1967 | B21D 3/10 |
| JP | S5942265 A | 3/1984 | |
| JP | S60157041 U | 10/1985 | |
| JP | 0213256 A2 | 3/1987 | |
| JP | 2012106309 A | 6/2012 | |
| RU | 543508 A | 1/1997 | |
| WO | 0224407 A1 | 3/2002 | |
| WO | 2015057201 A1 | 4/2015 | |

OTHER PUBLICATIONS

International Search Report for PCT/US2015/042697, 1 page.
Extended European Search Report for European Application No. EP15836017, dated Mar. 8, 2018, 3 pages.

* cited by examiner

21

OPEN CONTAINMENT FRAME FOR TARGETED COMPRESSION TREATMENT OF ROTATING SHAFT PRODUCTS

CROSS REFERENCE TO RELATED APPLICATIONS

This application claims priority to U.S. Provisional Patent Application No. 62/043,230, filed on 28 Aug. 2014 entitled "OPEN CONTAINMENT FRAME FOR TARGETED COMPRESSION TREATMENT OF ROTATING SHAFT PRODUCTS," the contents of which are incorporated by reference herein.

BACKGROUND

Inducing compressive residual stress into surfaces at critical design locations has been utilized to extend fatigue life in crankshafts and other rotating shaft applications. Methods that apply compressive residual stress have included roller (burnishing) treatments. These treatments are typically applied at journal fillet locations, which are representative of stress raisers within the shaft design. Current technologies have applied these roller (burnishing) treatments to crankshafts utilized within automotive to light-commercial engine applications.

BRIEF SUMMARY

One embodiment provides a suspended supporting device for targeted compression treatment of rotating shaft products, comprising: a containment frame including: a main portion; and an articulating arm including an attachment for at least one targeted compression cartridge. The at least one targeted compression cartridge includes at least one angled compression element. A support element attached to the main portion provides internal stabilization to the supporting device. A mechanism provides motion to the articulating arm with respect to the main portion. In an embodiment, an attachment mechanism for suspending the supporting device via attachment to an external element is included.

The suspended supporting device may include at least one angled compression element angled about 30 degrees. The suspended supporting device may include at least two angled compression heads. In an embodiment, the at least two angled compression heads have approximately the same degree of angle and face away from one another.

The suspended supporting device may include an external element as a vertical suspension element; whereby the suspended supporting device is suspended from the suspension element. The support element may comprise a bracket element attached to the main portion, with the support element including the attachment mechanism. The attachment mechanism comprises an eyelet.

In an embodiment, at least one of the main portion and the articulating arm may include targeted compression treatment heads of varying width profiles.

In an embodiment, the main portion and the articulating arm are configured to permit insertion and retention of a work piece of up to 220 mm journal diameters or greater.

In an embodiment, the mechanism providing motion to the articulating arm with respect to the main portion may include two or more hydraulic cylinders. The two or more hydraulic cylinders may comprise a first hydraulic cylinder positioned to move an end of the articulating arm about a pivot point with respect to the main portion; and a second hydraulic cylinder positioned to move the main portion with respect to the support element.

An embodiment includes an open containment frame having targeted compression treatment element(s) or head(s) and is not suspended.

An embodiment includes a compression treatment cartridge itself, including one or more angled heads or elements thereof.

An embodiment includes a method of pressure treating a work piece using a targeted compression treatment device as described herein.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
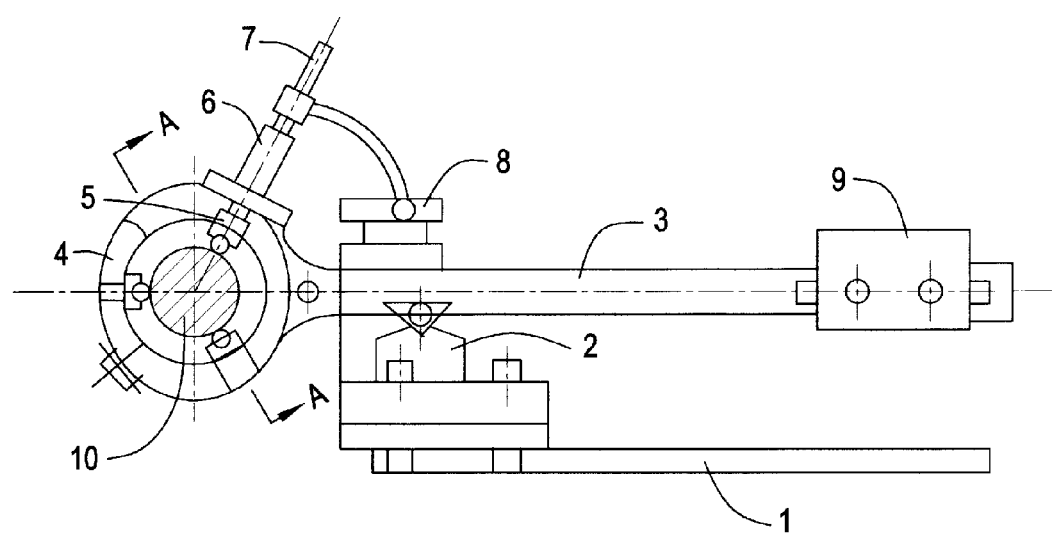
FIG. 1 illustrates an example closed containment frame for roller compression treatment of rotating shaft products.

It will be readily understood that the details of the example embodiments, as generally described and illustrated in the figures herein, may be arranged and designed in a wide variety of different ways in addition to the described example embodiments. Thus, the following more detailed description of the example embodiments is not intended to limit the scope of the claims, but is merely representative of certain example embodiments.

Reference throughout this specification to "embodiment(s)" (or the like) means that a particular feature, component, step or characteristic described in connection with the embodiment is included in at least one embodiment. Thus, appearances of the phrases "according to embodiments" or "an embodiment" (or the like) in various places throughout this specification are not necessarily all referring to the same example embodiment.

Furthermore, the described features, components, steps, or characteristics may be combined in any suitable manner in different embodiments. In the following description, numerous specific details are provided to give a thorough understanding of certain example embodiments. One skilled in the relevant art will recognize, however, that aspects can be practiced without certain specific details, or with other methods, components, materials, et cetera. In other instances, well-known structures, materials, components, steps or operations are not shown or described in detail to avoid obfuscation.

An embodiment provides devices and systems for targeted compressive stress treatment applicable to, but not limited to, medium and high speed diesel engine applications (marine, rail and power generation engine applications, etc.). Preparation for the treatment includes affixing of a shaft into a supporting device capable of axial rotation of the crankshaft. The device provides accessibility to the shaft journal surfaces. The device may also provide locations for support of the targeted compression equipment.

In an embodiment, the treatment consists of a containment frame that provides one targeted compression cartridge and two guidance supports. The targeted compression cartridge contains two individual compression inducing members oriented to provide contact within the surfaces of the fillet radius at each end of one bearing journal. The containment frame is for example constructed to affix onto a shaft within the opposing web surfaces of individual bearing journals.

The containment frame provides a hydraulic cylinder that serves multiple functions. Initially, cylinder retraction permits displacement of one portion of the frame to permit insertion of the crankshaft journal diameter. Extension of the cylinder encloses the crankshaft journal and ensures contact of the targeted compression cartridge and two guidance supports with the journal surfaces.

Continued pressure at the hydraulic cylinder generates an elevated normal force to be applied at the targeted compression cartridge and, through its compression inducing members, onto the crankshaft journal fillets. Once the shaft is positioned within the containment frame and a defined normal force is existent between the targeted compression cartridge and crankshaft journal fillets, the hydraulic cylinder may be partially retracted to remove the normal force and the supporting device rotates the crankshaft axially a pre-defined advancement. The normal force loading of the targeted compression device is re-applied and retracted, repeating the cycle of targeted compression application within the shaft journal fillets. The normal force application may be incrementally increased over multiple positional advancements to impart compressive residual stress as a pre-defined pattern within the journal fillet material.

An alternate construction of the targeted compression cartridge exists for example in the form of containing a singular compression inducing member. The tooling affixed within the secondary member location consists of an insert designed to provide alignment and support of the targeted compression cartridge, and distribute the normal force loading at that location across the journal surface. As designed, this alternate construction permits targeted compression to be induced at a singular crankshaft journal fillet location.

Differences from conventional fillet compression treatments provided by the various embodiments are numerous. For example, the containment frame provides pivoting movement of the targeted compression cartridge. This pivoting movement permits entry of the shaft work piece into the assembly without the need for disassembly of retention hardware of the containment frame. Also, the containment frame permits suspension of the treatment device from a vertical location above the shaft work piece. This assists in entry and removal of the work piece and acts in conjunction with the ease with which the work piece can be inserted into and extricated from the containment frame.

This construction also permits multiple targeted compression treatment devices to be affixed onto one shaft work piece for simultaneous multiple treatment. The vertical location suspension also permits the treatment device to remain effective to journal fillet locations that are not axially aligned with a crankshaft centerline ("pin" journals) during rotation of the work piece.

The targeted compression cartridges permit replacement or fitment with alternate compression inducing members and features, or the fitment of members or inserts that provide cartridge alignment, support, and displacement of normal force across the shaft journal surface to induce targeted compression, e.g., onto singular journal fillets only.

The targeted compression cartridge(s) provide self-alignment features of pivot and lateral travel of the compression inducing members to permit treatment of undercut journal fillet designs. The targeted compression cartridge(s) also provide generation of normal force application onto the journal fillet locations to affect compressive residual stress of materials, both as-fabricated and subjected to induction surface hardening, to depths extending beyond 5 mm and to 7 mm or greater of treatment depths below the journal surface.

The illustrated example embodiments will be best understood by reference to the figures. The following description is intended only by way of example, and simply illustrates certain example embodiments.

Referring to FIG. 1, in a conventional closed containment frame arrangement, a set of compression roller cartridges 5 (three are illustrated in the example) are housed in a containment frame taking the form of a clamp 4. Each cartridge 5 contains roller(s) oriented to provide contact within the surfaces of the fillet radius 10 (or other work piece) at each end of one bearing journal. The containment frame 4 is constructed to affix onto a crankshaft 10 and is supported by a mounting plate 1. The mounting plate 1 is stationary but a trolley provides movement ability to link 3 such that the non-circular or asymmetric work piece 10 may rotate while roller cartridges 5 maintain contact therewith. A counterbalance weight 9 promotes stability to the assembly. A hydraulic pump 8 provides force to the work piece via a cylinder 6, e.g., via in-line compression of the roller cartridge indicated at 5. Thus, as work piece 10 rotates while the roller(s) maintain contact therewith via roller cartridges (e.g., 5) of clamp 4 being forced into contact with the work piece 10 via hydraulic pump 6.

This set up features a closed containment clamp 4 design but may impart significant compressive stress to the work piece, i.e., suitable for larger applications, as further described herein. This clamp 4 ensures contact of roller cartridges 5 with work piece 10. However, the asymmetric nature of the work piece 10 (e.g., crankshaft fillet) in turn causes containment clamp 4 to move (laterally), e.g., about trolley assembly 2. The overall assembly is also quite large and the mounting plate 1 remains stationary within a work environment (e.g., takes up committed floor space). Moreover, to insert and extract work piece 10 from containment clamp 4 of FIG. 1, one needs to physically disassemble the containment clamp 4, which tends to be difficult and at the very least time consuming, precluding anything approaching high throughput in terms of treating multiple work pieces 10 in rapid fashion. Furthermore, such a floor mounted assembly tends to preclude multiple clamps 4 from being attached to a work piece 10 at the same time.

Figure 2:
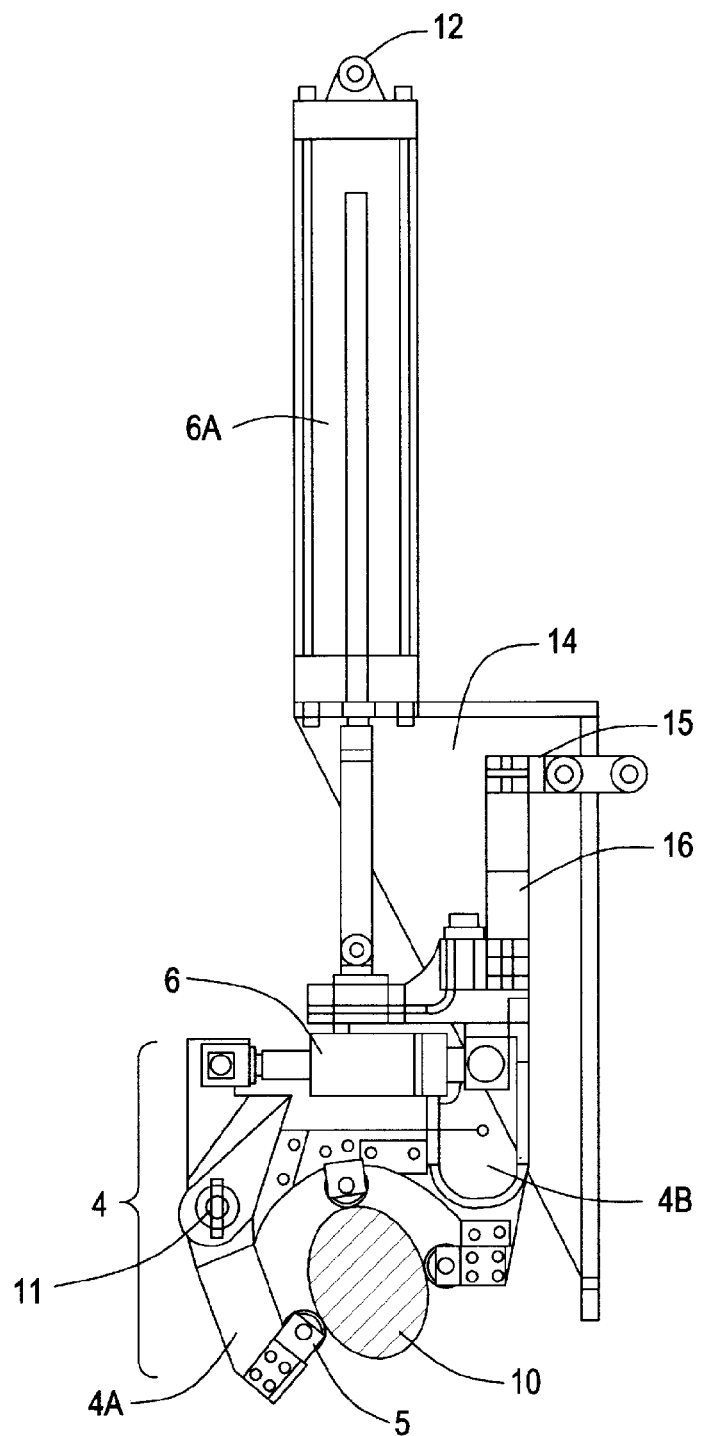
FIG. 2 illustrates an example open containment frame for roller compression treatment of rotating shaft products.

Referring to FIG. 2, an embodiment features an open containment frame arrangement whereby an opening is provided to a clamp 4. The example clamp 4 of FIG. 2 includes at least two parts 4A and 4B that move about one another, e.g., pivot about a point 11, such that the clamp 4 may be secured to the work piece 10 in a releasable fashion. Thus, in the example arrangement illustrated in FIG. 2, part 4A of clamp 4 may pivot about point 11 such that rollers 5 may contact and impart compressive stress to work piece 10 while providing treatment, but part 4A may also be released such that the work piece 10 may be taken out of the clamp 4 (or repositioned within the clamp 4) without disassembling the clamp 4. Movement of the arm 4A may be imparted by a hydraulic cylinder 6, as illustrated. This facilitates quicker insertion and removal of the work piece 10 and provides efficiency to the treatment process.

Stability of the overall assembly, e.g., as illustrated in FIG. 2, as opposed to fixing it to a location (e.g., floor secured mounting plate 1 shown in FIG. 1), is imparted via fixing various components against one another. This advantageously promotes stability while maintaining mobility of the overall unit. Thus, rather than fixing the entire unit in a stationary position, e.g., secured to the wall or the floor of a workspace, the entire unit may be suspended from a suspension element, e.g., via eyelet 12, such as from an overhanging crane unit. The entire unit therefore may be moved to different locations, e.g., to free up a portion of the work environment when assembly is not in use, or repositioned, e.g., to secure a work piece 10 therein more quickly.

Figure 4:
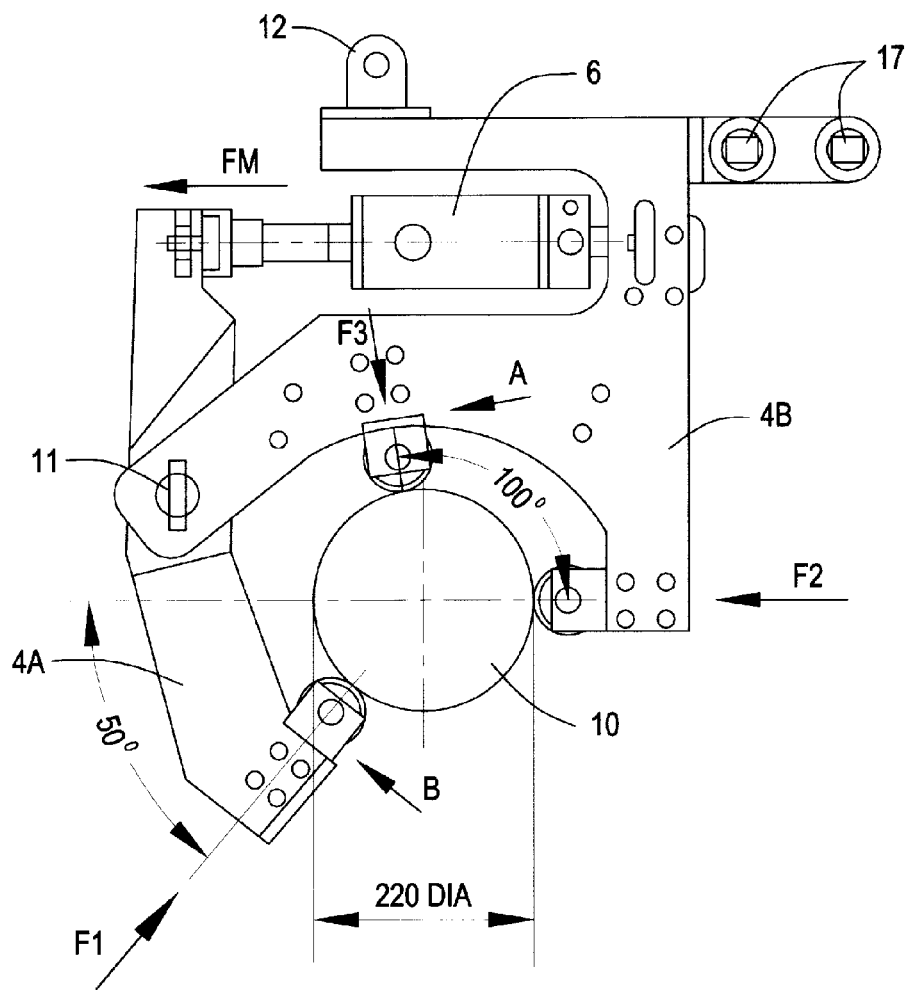
FIG. 4 illustrates another example open containment frame for roller compression treatment of rotating shaft products.

As may be appreciated from FIG. 2, the cylinder 6 provides movement of articulated arm portion 4A while main portion of the clamp 4B is in turn fixed relative to a bracket 14 (or like stability element, shown as transparent in FIG. 2 for ease of illustration) by an attachment 15. The attachment may take a variety of forms, e.g., having an arm portion 16 extending laterally from main portion 4B. Cylinder 6A for its part maintains force downward on main portion 4B such that clamp 4 is secured with respect to the bracket 14. For example, a main portion 4B of the containment frame 4 may be affixed to the bracket 14 such that the main portion 4B remains relatively stable with respect to the bracket 14 by virtue of forces imparted by the cylinders 6, 6A. As may be appreciated by those having skill in the art, other such arrangements may be utilized so long as the characteristics of stability and mobility of the assembly are maintained. One such alternative is illustrated in FIG. 4.

Figure 3:
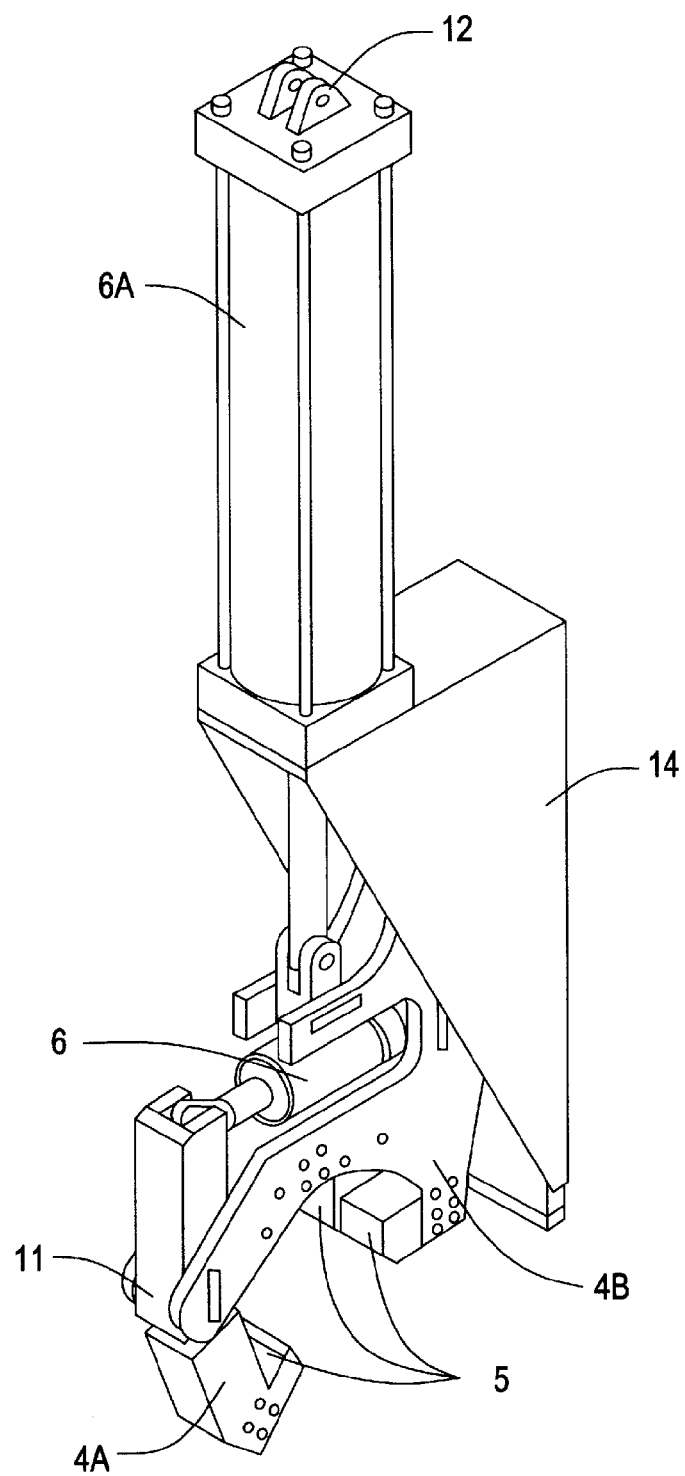
FIG. 3 illustrates a perspective view of an example open containment frame.

FIG. 3 illustrates a perspective view of the arrangement of FIG. 2, with the bracket 14 not being illustrated as transparent. The hydraulic cylinder(s) 6, 6A may serve multiple functions. Initially, the cylinder 6 permits displacement of one portion of the frame (e.g., 4A) to permit insertion of the work piece 10 (e.g., illustrated in FIG. 2). The cylinder 6 may then transition, e.g., via hydraulic pump, to enclose the work piece 10 and ensure contact of the rollers of cartridges, e.g., 5, with the work piece 10. Continued pressure at the hydraulic cylinder 6 provides an elevated normal force to be applied at all roller locations onto the work piece 10, e.g., crankshaft journal fillets.

Once the crankshaft or other work piece 10 is positioned within the containment frame 4 and normal force is existent between all rollers and crankshaft journal fillets 10, the crankshaft 10 may be rotated axially to permit travel of the rollers 5 along the circumferential surface of the journal fillets 10. The suspended assembly does not rotate as it is fixed, e.g., via attachment to an overhanging crane (not shown) via eyelet 12. The normal force of the rollers is incrementally increased over multiple rotations, e.g., via cylinder 6, to impart compressive residual stress into the journal fillet material 10.

Certain, e.g., two, of the cartridges may contain rollers of varying width profiles. One of the cartridges may contain rollers of parallel width profile. The function of the varying profile width is to provide alternating contact pressure onto the crankshaft fillet 10 as the surface is rotated across the roller 5. The function of the parallel width profile is to provide constant support to the crankshaft fillet 10 as the surface is rotated across the roller 5.

The open containment frame 4 configuration provides for scaling-up of the roller (burnishing) treatment to include rotating shaft products and crankshafts of various sizes, including work pieces 10 of much larger size than heretofore contemplated, e.g., up to 220 mm journal diameters or greater. Normal forces applied to the journal fillet surfaces may likewise be scaled up, e.g., in excess of 100 kN, and may be modified given the particular work piece 10, roller cartridges chosen, etc. This permits products of elevated mechanical property steels (e.g., quench and temper) and shafts of pre-conditioned surface hardening (e.g., via induction, nitride, carburized, and laser hardened) to receive improvement from this roller (burnishing) treatment.

Additionally, design of the open containment frame 4 as illustrated in FIG. 2 provides a pivoting movement of at least one compression roller cartridge, e.g., 5 (noting that more or fewer cartridges may be used than illustrated in the examples of the figures). This pivoting movement permits entry of the shaft work piece 10 into the assembly without the need for disassembly of retention hardware of the containment frame 4. As will be readily appreciated by those having skill in the art, this provides for quicker insertion, repositioning and removal of work pieces compared to arrangements such as illustrated in FIG. 1.

Furthermore, the configuration of the open containment frame 4 permits suspension of the treatment assembly from a vertical location above the shaft work piece 10, e.g., from eyelet 12. This assists, among other things, in entry, repositioning and removal of the work piece 10. This also permits multiple roller (burnishing) treatment devices to be affixed onto one shaft or work piece 10 at a time, allowing for simultaneous multiple treatments to be applied. The vertical suspension also permits the treatment assembly to remain effective to journal fillet locations that are not axially aligned with a crankshaft centerline ("pin" journals) during rotation of the work piece 10. That is, the assembly may move about the vertical attachment at eyelet 12 in multiple planes, rather than simply in one direction e.g., laterally, as with travelling trolley arrangement illustrated in FIG. 1. Again, the containment frame 4 does not rotate axially with the work piece 10 (which is in turn rotated, e.g., via a lathe (not shown)).

In an embodiment, the roller cartridges 5 may be interchanged to accommodate various work pieces 10. Thus, the clamp assembly is configured to interchangeably accommodate different roller cartridges 5 via cartridge attachments that permit replacement or fitment with alternate roller profiles and features. For example, fitment of impacting rods or profiled rams may be used to induce compressive residual stress into the journal fillet material 10. The assembly is thus modular and provides generation of normal force application onto the journal fillet locations 10 to affect compressive residual stress of material depths extending beyond 5 mm and to 7 mm of treatment depths below the journal surface. Thus, imparting compressive residual stress for larger work pieces 10 (e.g., marine and locomotive crank shafts) is possible with such an assembly.

FIG. 4 illustrates an alternate example. In FIG. 4, the cylinder 6A has been omitted and a single cylinder 6 is included. As illustrated, the claim assembly remains of the open configuration, with an articulating arm 4A that pivots about point 11 with respect to a main clamp portion 4B. The eyelet 12 (or other suitable attachment assembly) here is directly affixed to the main portion 4B, rather than to the top of the cylinder 6A as in FIG. 2 and FIG. 3. While the bracket has been omitted in FIG. 4, it will be appreciated that attachment 17 may provide for attachment of main portion 4B to a bracket (e.g., bracket 14) or like stabilizing element. The attachment 17, as illustrated, may include roller portions or like arrangement such that the main portion 4B may be secured at various positions to a bracket or like stabilizing element (not shown for ease of illustration).

Figure 5B:
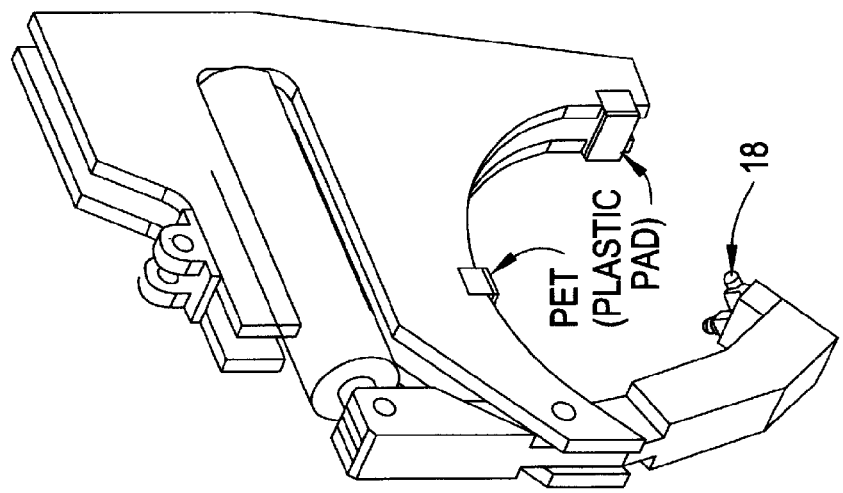
FIG. 5(A-B) illustrates an example targeted compression insert for an open containment frame for targeted compression treatment of rotating shaft products.
Figure 5A:
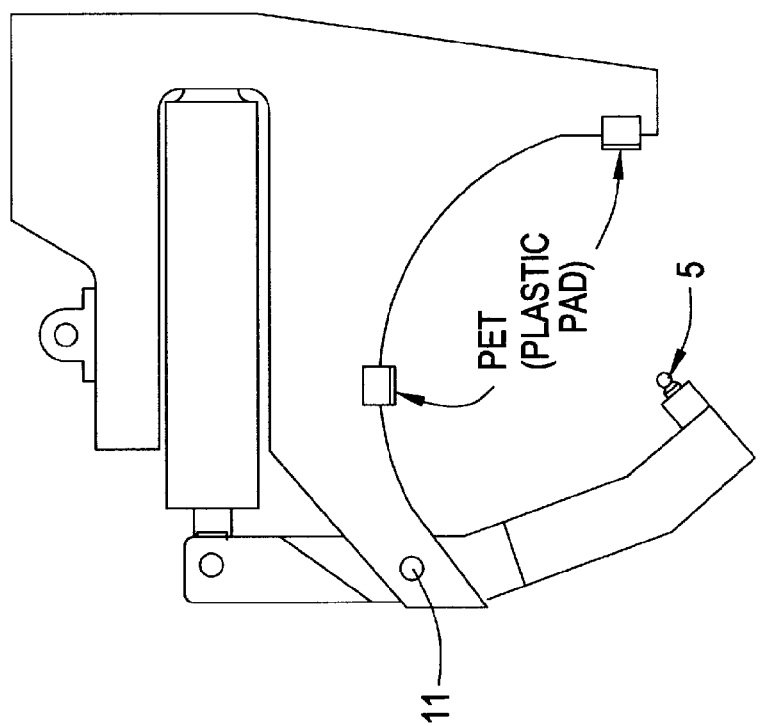

Referring to FIG. 5 (A-B), an example cartridge 5 insert for an open containment frame for targeted compression treatment of rotating shaft products is illustrated. Here, a targeted treatment insert or cartridge 5 is illustrated in this non-limiting example as inserted on the arm extending from the pivot 11. As illustrated, only one such cartridge 5 need be used, although this is a non limiting example. Plastic or other material supports or pads may be used in other cartridge locations, as illustrated. Alternatively, two or more targeted compression cartridges 5 may be used, e.g., in the position(s) of the plastic pads illustrated in FIG. 5A and FIG. 5B.

FIG. 5B particularly illustrates that the targeted cartridge 5 includes at least one angled peening head 18, and may include two as illustrated, or more, with one denoted with the reference numeral 18. The angle may be selected based the work piece inserted into the container. An example angle is about 30 degrees from perpendicular with respect to a surface of the cartridge 5, as illustrated for heads in FIG. 6A. The angled head or element 18 facilitates impacting or contacting areas of the shaft in a targeted manner. This, in combination with the use of the open container (e.g., as described in FIG. 2-FIG. 4) permits for very precise and flexible targeting of areas of the shaft that are to be subjected to compressive stress treatment.

Figure 6A:
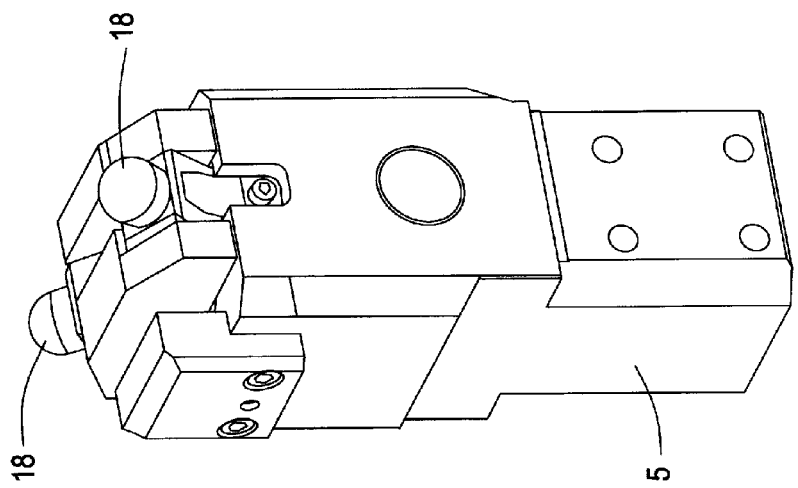
FIG. 6A illustrates another example targeted compression insert for targeted compression of rotating shaft products.

In FIG. 6A is illustrated an example cartridge 5 fitted with two heads 18 for targeted compression treatment. Such a cartridge 5 may be used, for example, in treating shaft journal fillets or like areas with targeted compressive force afforded by the angle of the heads 18 of the targeted cartridge 5. One of the heads 18 of the cartridge 5 may be replaced with a fitting or insert that acts to further target the force imparted by the remaining head 18. Thus, for example, an insert may be a tool steel or other like material that abuts a portion of the work piece such that the remaining head 18 impacts the work piece in a targeted fashion. Additionally, targeted compression treatment heads 18 of varying width profiles or shapes may be used in a cartridge 5 or cartridges 5. Therefore, the cartridge 5 may include only one head 18, rather than two. Of course, depending on the type of work piece at hand, more than two heads 18 may be included in a cartridge, as well as may other types of inserts (e.g., shapes other than peening heads used to impart residual stress, rollers being one example as illustrated in FIG. 2-FIG. 4).

Figure 6B:
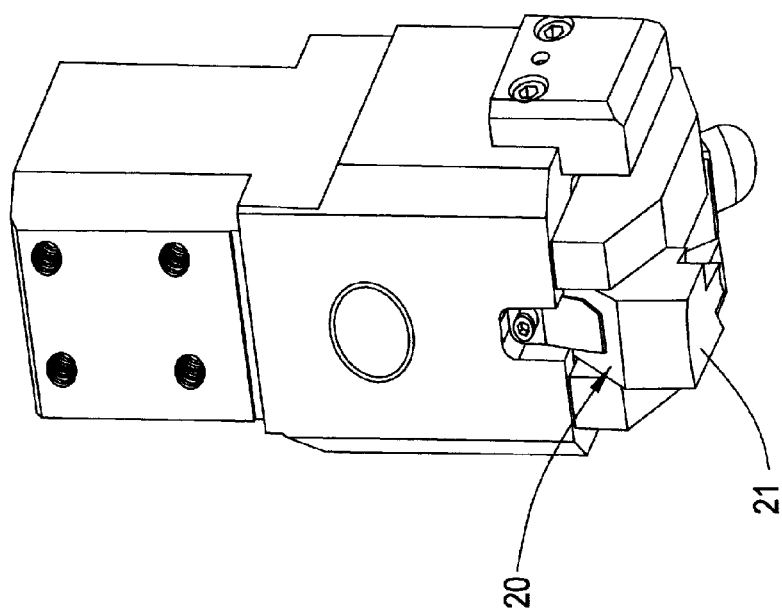
FIG. 6B illustrates an example targeted compression insert with a peening head replaced with a non-peening insert.
Figure 7D:
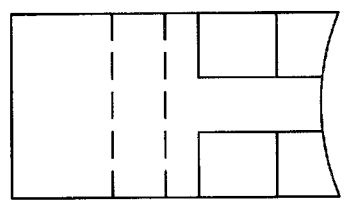
FIG. 7(A-D) illustrates an example non-peening insert.
Figure 7B:
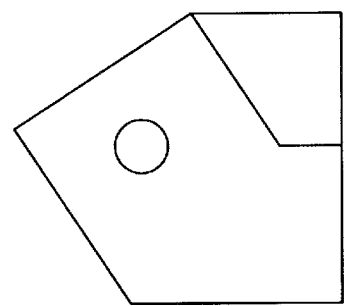
Figure 7C:
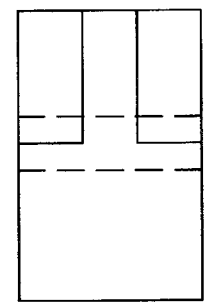
Figure 7A:
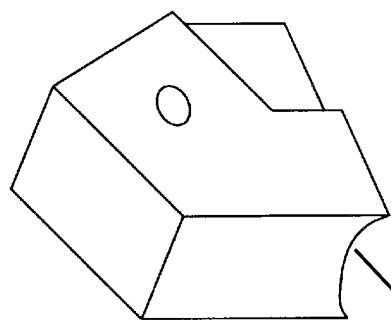

FIG. 6B illustrates an example cartridge having a non-peening insert 20. As shown, the peening head (e.g., 18 of FIG. 6A) is replaced with a relatively flat or contoured surface 21 provided by the non-peening insert. This provides for both stabilizing effect of the cartridge generally with respect to the work piece, with surface 21 contacting the work piece (not illustrated for clarity). This also provides for application of targeted and thus greater pressure application via remaining peening heads or tools.

An example configuration of a non-peening insert is illustrated in FIG. 7(A-D). The non peening insert of FIG. 7(A-D) corresponds to the example illustrated in FIG. 6B, although not inserted into the cartridge. FIG. 7A offers a perspective view in which the surface 21 that contacts the work piece is generally oriented towards the bottom of the illustration. FIG. 7C offers a bottom view of the non-peening insert, i.e., bottom surface 21. FIG. 7B for its part illustrates a side view of the non-peening insert, whereas FIG. 7D illustrates a top view thereof, i.e., the end which is inserted into a cartridge.

Figure 8:
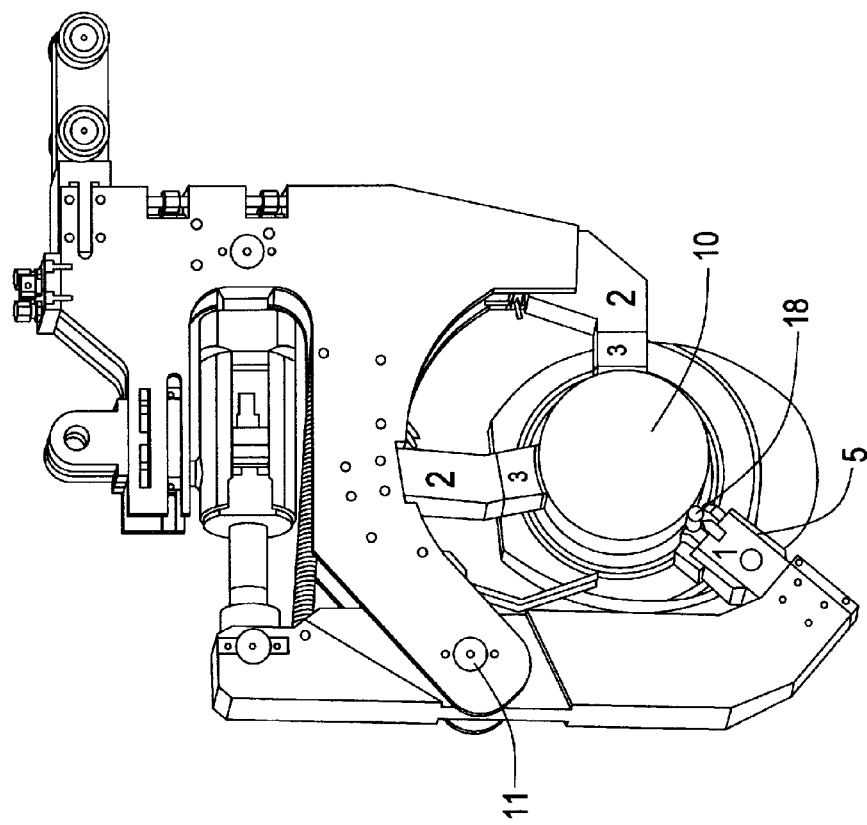
FIG. 8 illustrates an example open containment frame for targeted compression treatment with a work piece inserted therein.

As illustrated in the example of FIG. 8, a work piece 10 may be fitted within the open container by virtue of pivoting about point 11 such that, on compression of the cartridge 5 having heads 18, the work piece 10 situated therein is subjected to compressive force imparting residual stress to an area contacted specifically by heads 18 (only one of which is visible in FIG. 8). It is worth noting that the head 18 positioned towards the work piece 10 (and thus not visible in the view of FIG. 8, refer to FIG. 5B) contacts the work piece 10 in a specific area that is to be targeted for residual compressive stress treatment. It also bears noting that because of heads' 18 smaller size (contact area), an increased amount of residual stress (e.g., to a depth exceeding 7 mm) is possible using a reduced amount of force.

From the foregoing it will be appreciated that various embodiments provide for a compression treatment method or process, which may be specifically targeted to difficult to reach areas on the work piece, and that is moreover applicable to medium-speed and high-speed diesel engine applications (e.g., marine, rail and power generation engine applications). The various assemblies, including an open type containment frame, allow for affixing of a rotatable shaft or other work piece into a supporting device capable of axial rotation of the crankshaft. The embodiments thus provide supporting devices with greater accessibility to the treatment surfaces (e.g., crankshaft journal surfaces) with improved mobility and throughput compared to other arrangements.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

In the specification there has been set forth example embodiments and, although specific terms are used, the description thus given uses terminology in a generic and descriptive sense only and not for purposes of limitation.

Finally, any numerical parameters set forth in the specification and claim(s) are approximations (for example, by using the term "about") that may vary depending upon the desired properties sought to be obtained by the embodiment(s). At the very least, each numerical parameter should at least be construed in light of the number of significant digits and by applying ordinary rounding.

What is claimed is:

1. A suspended supporting device for targeted compression treatment of rotating shaft products, comprising:
   a containment frame including:
      a main portion; and
      an articulating arm including an attachment for at least one targeted compression cartridge, said at least one targeted compression cartridge including at least one angled compression element;
   a supporting element attached to the main portion and providing internal stabilization to the supporting device;
   a mechanism providing motion to the articulating arm with respect to the main portion, wherein the mechanism providing motion to the articulating arm with respect to the main portion comprises two or more cylinders;
   wherein the two or more cylinders comprise:
      a first cylinder positioned to move an end of the articulating arm about a pivot point with respect to the main portion; and
      a second cylinder positioned to move the main portion with respect to the support element; and
   an attachment mechanism for suspending the supporting device via attachment to an external element.

2. The suspended supporting device of claim 1, wherein the at least one angled compression element is angled about 30 degrees.

3. The suspended supporting device of claim 1, wherein the at least one angled compression element comprises at least two angled compression heads.

4. The suspended supporting device of claim 3, wherein the at least two angled compression heads have approximately the same degree of angle and face away from one another.

5. The suspended supporting device of claim 1, wherein the external element is a vertical suspension element;
   whereby the suspended supporting device is suspended from the suspension element.

6. The suspended supporting device of claim 1, wherein the support element comprises a bracket element attached to the main portion and further wherein the support element includes the attachment mechanism.

7. The suspended supporting device of claim 1, wherein the attachment mechanism comprises an eyelet.

8. The suspended supporting device of claim 1, wherein at least one of the main portion and the articulating arm includes targeted compression treatment heads of varying profiles.

9. The suspended supporting device of claim 1, wherein the main portion and the articulating arm are configured to permit insertion and retention of a work piece of up to 220 mm journal diameters or greater.

10. The suspended supporting device of claim 1, wherein the support element comprises a bracket attached to the main portion.

* * * * *